United States Patent
Taylor et al.

(10) Patent No.: US 10,089,599 B2
(45) Date of Patent: Oct. 2, 2018

(54) SYSTEMS AND METHODS FOR LOCATING CONTAINERS WITH LOW INVENTORY

(71) Applicant: Wal-Mart Stores, Inc., Bentonville, AR (US)

(72) Inventors: Robert J. Taylor, Rogers, AR (US); Nicholaus A. Jones, Fayetteville, AR (US); Aaron J. Vasgaard, Rogers, AR (US); Matthew A. Jones, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/475,353

(22) Filed: Mar. 31, 2017

(65) Prior Publication Data

US 2017/0293880 A1    Oct. 12, 2017

Related U.S. Application Data

(60) Provisional application No. 62/319,521, filed on Apr. 7, 2016.

(51) Int. Cl.
*G06Q 30/00* (2012.01)
*G06Q 10/08* (2012.01)
*H04R 1/40* (2006.01)

(52) U.S. Cl.
CPC ............ *G06Q 10/087* (2013.01); *H04R 1/406* (2013.01); *H04R 2201/401* (2013.01)

(58) Field of Classification Search
CPC .... G06Q 10/087; G06Q 10/101; G06Q 30/02; G06Q 30/0251; G06Q 30/0255;

(Continued)

(56) References Cited

U.S. PATENT DOCUMENTS 6,142,375 A    11/2000  Belka
7,519,703 B1 *  4/2009  Stuart ............... G06F 21/554
                                                         709/217

(Continued)

FOREIGN PATENT DOCUMENTS

WO       2000061438        10/2000

OTHER PUBLICATIONS

PCT; App No. PCT/US2017/025372; International Search Report and Written Opinion dated Jun. 27, 2017.

*Primary Examiner* — Thien M Le
(74) *Attorney, Agent, or Firm* — Fitch, Even, Tabin & Flannery LLP

(57) ABSTRACT

In some embodiments, apparatuses and methods are provided herein useful to locating containers with low inventory in a shopping facility. Some of these embodiments include systems for identifying and determining the location of containers in a low inventory condition in shopping facilities, the system comprising: a container configured to hold merchandise items in a shopping facility; a light sensor disposed in the container, the light sensor calibrated to detect an ambient light level and to respond when the detected ambient light level exceeds a predetermined ambient light threshold; and a control circuit operatively coupled to the light sensor and configured to transmit a signal indicating a low inventory condition when the light sensor determines the detected ambient light level exceeds the predetermined ambient light threshold.

14 Claims, 3 Drawing Sheets

(58) Field of Classification Search
CPC ... G06Q 30/0261; G06Q 30/0269; G06F 21/88;
G06F 2221/2111; G06F 21/86
USPC ........................................................ 235/385
See application file for complete search history.

(56) References Cited

U.S. PATENT DOCUMENTS

| | | |
|---|---|---|
| 8,260,456 B2 | 9/2012 | Siegel |
| 8,321,304 B2 | 11/2012 | Khan |
| 8,988,232 B1* | 3/2015 | Sloo ........................ G01N 27/02 340/602 |
| 2006/0071774 A1 | 4/2006 | Brown |
| 2007/0069867 A1 | 3/2007 | Fleisch |
| 2009/0095696 A1 | 4/2009 | Lang |
| 2009/0319399 A1 | 12/2009 | Resta |
| 2010/0134299 A1* | 6/2010 | Fitzgerald ............... G06F 21/88 340/573.1 |
| 2010/0138297 A1* | 6/2010 | Fitzgerald ............... G06F 21/88 705/14.53 |
| 2012/0056026 A1 | 3/2012 | Matlin |
| 2013/0053053 A1 | 2/2013 | Agarwal |
| 2013/0176398 A1 | 7/2013 | Bonner |
| 2014/0201041 A1 | 7/2014 | Meyer |
| 2016/0134930 A1* | 5/2016 | Swafford ............... A47F 5/0068 725/80 |
| 2016/0261932 A1* | 9/2016 | Fadell ...................... H04Q 9/00 |
| 2017/0293880 A1* | 10/2017 | Taylor .................. G06Q 10/087 |

\* cited by examiner

SYSTEMS AND METHODS FOR LOCATING CONTAINERS WITH LOW INVENTORY

CROSS-REFERENCE TO RELATED INVENTION

This invention claims benefit of U.S. Provisional Application No. 62/319,521, filed Apr. 7, 2016, which is incorporated herein by reference in its entirety.

TECHNICAL FIELD

This invention relates generally to identifying and locating containers with low inventory, and more particularly, to identifying and locating containers with low inventory using ambient light sensors.

BACKGROUND

In the retail setting, one of the more important challenges is accurately tracking the inventory on shelves and bins containing merchandise items. More specifically, shopping facilities seek to identify and locate shelves and containers in a low inventory condition (including a no inventory condition) and restock those shelves and containers before they run out of inventory. If the shelves or containers run out of inventory, this lack of available inventory may result in loss of sales or may result in delay and customer dissatisfaction while customers wait for employees to search for available inventory in other locations, such as a back room or general stock holding area.

This challenge is more pronounced for containers that do not hold regular inventory but that instead hold unusual merchandise items, such as promotional items. Frequently, inventory systems are in place to monitor standard shelves that are stationary and generally hold the same inventory. These shelf locations are known and generally fixed locations. In contrast, containers that hold promotional and other non-standard merchandise items may be frequently moved to different locations within the shopping facility or may be stocked with a constantly changing type of merchandise items, such as when the shopping facility changes from one promotion to a different promotion. Certain containers, such as bins, are often located in the aisles (not on standard shelves) and may be moved to other aisles or locations in the shopping facility. Accordingly, these circumstances present a challenge in identifying containers having low inventory conditions as well as determining the actual location of these containers.

Accordingly, there is a need to provide improved systems and methods for identifying and locating containers holding such merchandise items. Some types of merchandise items are carried in movable containers and not on shelves, and many current inventory tracking systems do not apply as well for these containers of merchandise items. There is a need to be able to determine the locations of these containers when they are in a low inventory condition.

BRIEF DESCRIPTION OF THE DRAWINGS

Disclosed herein are embodiments of systems, apparatuses and methods pertaining to identifying and locating containers in a shopping facility with a low inventory of merchandise items. This description includes drawings, wherein.

Figure 1:
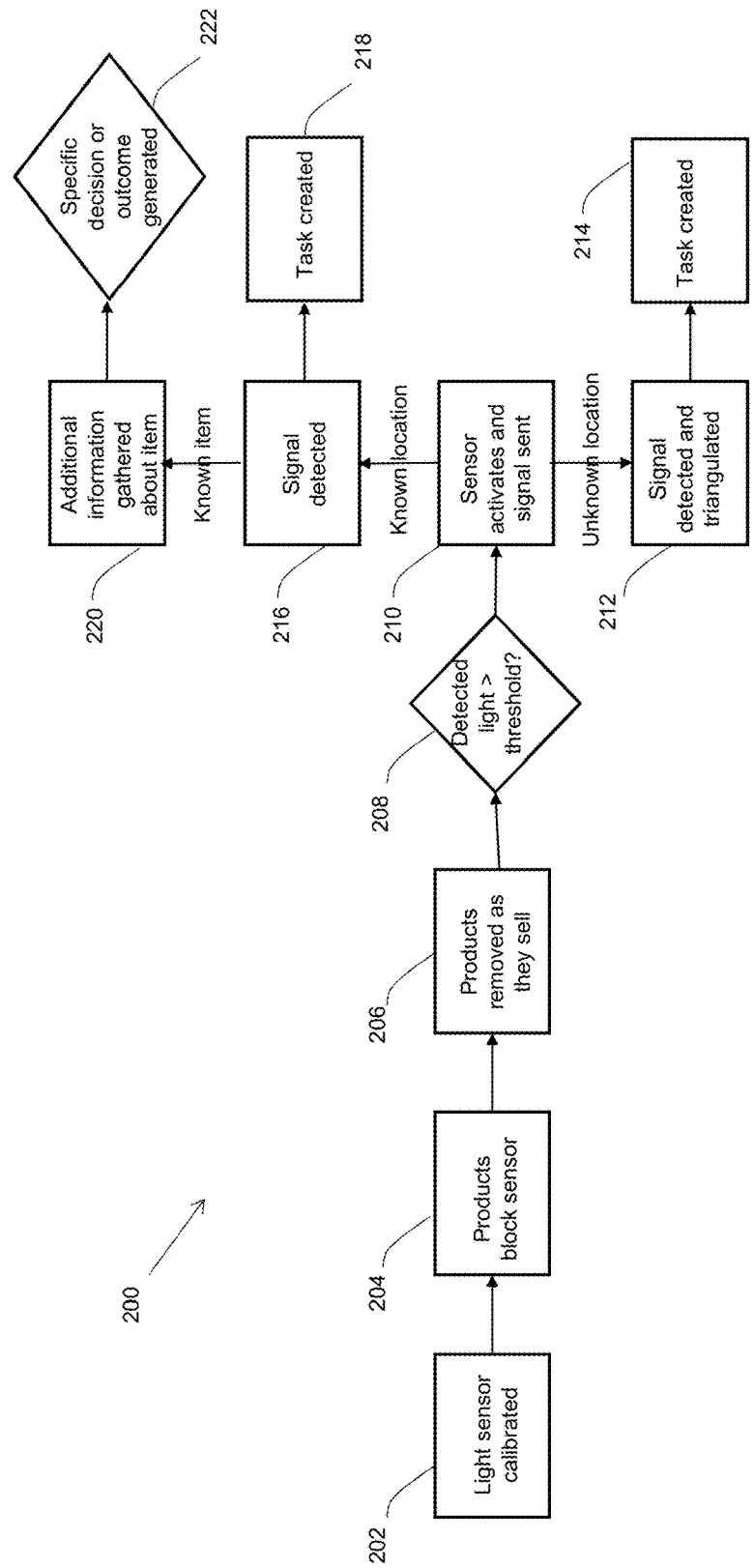
FIG. 1 is a flow diagram in accordance with several embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to identifying and locating containers containing merchandise items in a shopping facility that are in a low inventory condition (which includes no inventory in the container). In one form, there is provided a system for identifying and determining the location of containers in a low inventory condition in shopping facilities, the system comprising: a container configured to hold merchandise items in a shopping facility; a light sensor disposed in the container, the light sensor calibrated to detect an ambient light level and to respond when the detected ambient light level exceeds a predetermined ambient light threshold; and a control circuit operatively coupled to the light sensor and configured to transmit a signal indicating a low inventory condition when the light sensor determines the detected ambient light level exceeds the predetermined ambient light threshold.

In some forms, the system may further include a predetermined array of sensors arranged about a predetermined area of the shopping facility, the array of sensors arranged to receive the signal and identify the location of the container with the low inventory condition within the shopping facility. In addition, the system may include a server in communication with the array of sensors, the server configured to receive information regarding the location of the container and to create a task to address the low inventory condition. More particularly, in the system, the sensors may comprise microphones and the signal may comprise an audio signal.

In another form, there is provided a method of identifying and locating containers holding merchandise items in a low inventory condition within shopping facilities, the method comprising: providing a light sensor that detects ambient light; positioning the light sensor in a container in a shopping facility; depositing a sufficient number of merchandise items in the container to block the light sensor from ambient light in excess of a predetermined ambient light threshold; and activating a control circuit when the detected ambient light level exceeds the predetermined ambient light threshold to transmit a signal.

Further, in some forms, the method includes calibrating the light sensor to respond to ambient light when the detected ambient light level exceeds the predetermined ambient light threshold. The calibration may be manually initiated or performed automatically. In addition, the method may further include arranging a predetermined array of sensors about a predetermined area of the shopping facility, the array of sensors arranged to receive the signal and identify the location of the container with a low inventory condition within the shopping facility. Also, the method may include communicating the location to a server and creating a task to address the low inventory condition. As one example, the sensors may be microphones and the signal may be an audio signal.

In shopping facilities, there are numerous possible locations for shelves and containers for holding merchandise items. In addition, shelves holding standard, more permanent types of merchandise items may be located in generally fixed locations, while potential locations of containers or bins holding more temporary merchandise items, such as promotional items, may be located in the aisles themselves. The bins may change location frequently, as it may be determined that their placement at a certain location may be advantageous based on the proximity to other merchandise items on shelves. Further, the nature of the merchandise items in a particular bin may change relatively frequently, such as where one promotional item has run its course and is replaced by another. These are not generally assigned to a location and may be in any of various locations throughout the shopping facility. These two characteristics of constantly changing bin location and constantly changing product type can make identifying low inventory conditions challenging.

Referring to FIG. 1, there is shown a flow diagram of a process 200 in accordance with one form. This process 200 shows an example of using an ambient light sensor in a container of merchandise items to determine a low inventory (including a no inventory) condition. Once such a container is detected and identified, its status and location are then preferably transmitted to a device where this low inventory condition can be addressed.

At block 202, an ambient light sensor is provided and preferably calibrated to the lighting conditions of the area of the shopping facility where the container holding merchandise items is to be located. The calibration may be manually initiated by a shopping facility employee to a desired setting, or the light sensor may be automatically calibrated to a desired setting according to any of various known algorithms or instructions. The calibration preferably takes into account the ambient lighting conditions in order to set an appropriate predetermined ambient light threshold for activation.

At block 204, the ambient light sensor is positioned within the container in a location where it will generally be concealed by merchandise items, such as at or near the bottom, and merchandise items are then placed over the light sensor. A sufficient number of merchandise items are deposited in the container such that the merchandise items/products block the light sensor from ambient light in excess of the predetermined (calibrated) ambient light threshold. In other words, the container is filled with a sufficient number of merchandise items such that the detected ambient light is less than the calibrated ambient light threshold so that the light sensor is not activated. In this context, the light sensor may be configured to "start" or "power on" after being covered with merchandise items, such as by a timer or by a setting in which it ignores light level readings until it is covered.

Block 206 is not actually part of process 200 but is instead included to provide a full understanding of the operation of the process 200. At block 206, merchandise items/products are generally removed from the container usually by customers as they are being sold. However, it is also contemplated that some of the merchandise items may be removed in the ordinary course by employees or other individuals for various other reasons, such as due to shifting inventory requirements, the need for some of the merchandise items in a different shopping facility or location within the shopping facility, an order placed remotely and being filled by an employee, and customers removing merchandise items from the container but not completing the sale. Also, it is contemplated that merchandise items may be added to the container before the container reaches a low inventory condition. For purposes of process 200, it is contemplated that the merchandise items initially added or added at a later time will generally be removed in the ordinary course of business, and at some point, the merchandise items in the container may reach a low inventory condition (including having no merchandise items in the container).

At block 208, a sufficient number of merchandise items has been removed from the container such that the ambient light sensor is exposed to some extent. At this time, the ambient light level detected by the sensor exceeds the predetermined ambient light level threshold for activation. This detection indicates that the container is in a low inventory condition.

At block 210, the ambient light sensor activates a control circuit when the detected ambient light level exceeds the predetermined ambient light threshold to transmit a signal. The light sensor is operatively coupled to the control circuit, which configured to transmit a signal indicating a low inventory condition when the light sensor determines the detected ambient light level exceeds the predetermined ambient light threshold. In other words, when the light sensor detects a sufficient level of ambient light, it will trigger the control circuit and result in the transmission of a signal. In one form, the light sensor and control circuit may be part of a unitary structure.

In an alternative form, the ambient light sensor may be calibrated to have two or more different thresholds. For example, one threshold could correspond to a low inventory condition, while a second, higher threshold could correspond to an even lower/no inventory condition. In this example, the control circuit may be configured to transmit a first signal indicating low inventory and to transmit a second, subsequent signal indicating no inventory. It may be desirable to transmit the first signal to allow for restocking when inventory is low, and then, if restocking has not occurred, to transmit the second signal where there is no inventory remaining in the container. The characteristics of this second signal may be selected so as to indicate greater urgency for immediate action. Further, as should be evident, the ambient light sensor may be calibrated with multiple thresholds for the transmission of signals indicating ever-decreasing low levels of inventory in the container.

In one form, at block 210, the method may include activating a visual indicator, such as a flashing light, on or near the container. The control circuit may be operatively coupled to the visual indicator indicating the location of the container and may be configured to activate the visual indicator when the detected ambient light level exceeds the predetermined ambient light threshold. The visual indicator may be part of a unitary structure or may be separate but in communication with the control circuit. The visual indicator may provide an alert to a nearby employee to resupply the container.

From block 210, the process 200 may then continue differently depending on whether the location of the container is a known/unknown location and whether the type of merchandise items in the container is known. In one form, it is contemplated that the container may be used to hold promotional or other non-standard merchandise items that may be frequently moved to different locations within the shopping facility or that may be stocked with constantly changing types of merchandise items. Block 212 shows a next step of the process 200 where the location of the container is unknown. In this circumstance, a predetermined array of sensors may be arranged about a predetermined area of the shopping facility. Indeed, the array may be arranged throughout much of the entire shopping facility, including locations accessible to customers and back room and holding areas where inventory may be stored. The array of sensors is arranged to receive the signal and to identify the location of the container with the low inventory condition within the shopping facility. This location is preferably communicated to a server within or remote from the shopping facility, to mobile devices of employees or other individuals, or to other appropriate devices. The array of sensors may be a single sensor or may be multiple sensors and may be arranged in various patterns.

For example, the sensors may be microphones that are arranged to receive an audio signal triggered by the control circuit. The control circuit may be operatively coupled to a speaker such that the control circuit causes the speaker to emit an audio signal when the light sensor is activated. In one form, the light sensor, control circuit, and speaker may collectively be part of a unitary structure. The audio signal may be pitched to be supra-auditory and generally inaudible to customers so as not to disturb customers engaged in shopping activities. A standard range of audible sound frequencies is from about 20 to 20,000 Hertz, so in one form, it may be desirable to select a high frequency audio signal (such as, for example, 30,000 Hertz) to be transmitted to the microphones. The array of microphones are arranged to triangulate the specific location of the container with the low inventory condition. In one form, this triangulation may be determined from the specific microphones that detect the audio signal and the intensity of the audio signal at the various microphones.

At block 214, the server (or other device) creates a task to address the low inventory and to service the location. This task may include (or may lead to tasks involving) checking to determine the nature of the inventory and seeing if any additional inventory is located at the shopping facility. It may also include ordering additional inventory if there is no remaining inventory at the shopping facility. Alternatively, or in addition, the task may include replacing the low inventory in the container with a different type of merchandise item. If additional inventory is available, the task may include delivering that additional inventory to the container.

Block 216 shows a step of the process 200 where the location of the container is known. For example, the control circuit may be configured to transmit an identification code with various desired data, including the location of the container. In this circumstance, the identification code may be received by a predetermined array of sensors arranged about a predetermined area of the shopping facility, as described above. Alternatively, the identification code might be communicated directly to a server within or remote from the shopping facility, to mobile devices of employees or other individuals, or to other appropriate devices. In this instance, because the location is known, there would be no need to triangulate the specific location of the container, as was the case in block 212.

In an alternative form, a speaker may be used to emit an audio signal that transmits an identification code. More specifically, the control circuit may be configured to cause the speaker to emit unique tones or sequences of tones where each tone or sequence indicates a different identification code. The acoustic characteristics of the tones or sequences of tones, such as frequency, volume, and the like, may be varied to indicate different identification codes. Each different identification code may thereby communicate specific information regarding the location of the container within the shopping facility, the product type in the container, and/or other desired data.

Block 218 shows a next step of the process 200 involving a known container location where the type of merchandise item is not known. At block 218, the server (or other device) creates a task to address the low inventory condition. Because the merchandise item is not known, this task may also involve checking the type of merchandise item. Additional subsequent tasks may include seeing if this type of merchandise item is available at the shopping facility, resupplying the container with additional inventory, and/or ordering additional inventory.

Block 220 shows a next step of the process 200 involving a known container location where the type of merchandise item is also known. This information may also be included with the identification code and/or may be gathered from shopping facility servers. In this circumstance, as shown in block 222, because more information is readily available, the task may immediately include generating a more specific decision or outcome. For example, the server may check to see if there is a back room quantity (or additional inventory at the shopping facility), and if so, to deliver some of that quantity to the container. Additionally, if there is a determination that the on hand quantity at the shopping facility is below a certain threshold, the server may make a decision to remove that merchandise item from sale at the shopping facility.

It should be understood that the process 200 may then be started over again with the light sensor in a different area of the shopping facility. For example, the light sensor may be moved to a container in a different part of the shopping facility or the entire container with the light sensor may be moved to a different part of the shopping facility. The light sensor is the preferably recalibrated to respond to the different predetermined ambient light threshold when the light sensor and/or container are moved to the different shopping facility location. In this circumstance, the different predetermined ambient light threshold may correspond to the ambient light conditions at the different shopping facility location. Alternatively, the light sensor and/or container may be moved to an entirely different shopping facility and the light sensor recalibrated.

Figure 2:
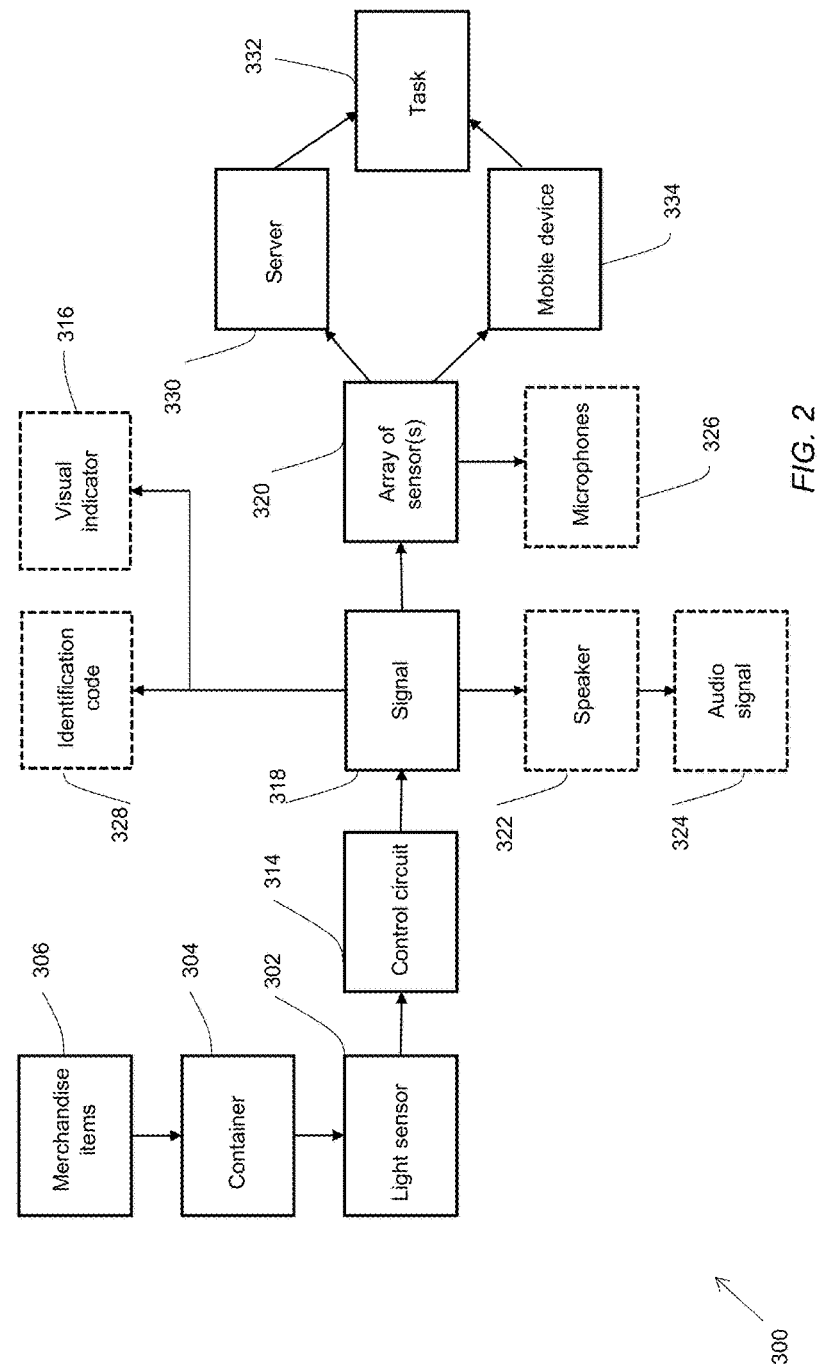
FIG. 2 is a block diagram in accordance with some embodiments.

Referring to FIG. 2, there is shown a system diagram showing various components for identifying and locating a container having merchandise items in a low inventory condition. As can be seen in the diagram, the system 300 includes an ambient light sensor 302 that detects ambient light and activates when the detected light is above a predetermined threshold. The ambient light sensor 302 may be any of various available light sensors with known light sensitive components. In one form, the sensor 302 may include one or more of the following light sensitive components: a phototransistor, a photodiode, or a photoresistor. The ambient light sensor 302 may be deposited at or near the bottom of a container 304 intended to hold merchandise items 306, such as promotional items.

As should be evident, any of a variety of containers 304 may be used. For example, these container types may include one or more of end caps with retail ready packaging, dump bins, and pallet displays. An end cap is a display for a product (or feature) placed at the end of an aisle. Promotional products are often disposed on an end cap because it is expected they will sell more quickly in this location. Another type of container commonly used for promotional items is a dump bin. As should be evident, in this freestanding container, products are stacked somewhat haphazardly atop one another, and in accordance with the systems and methods described herein, an ambient light sensor may be disposed at or near the bottom of the dump bin. Another type of container is a pallet display in which merchandise may be supported on a pallet. These examples of containers are frequently used to sell promotional items and are often located at the end of or within aisles. However, it should be evident that the systems and methods described herein could be applicable to many other types of containers and are not limited to use in aisles or any particular areas (but may be used in many other locations of the shopping facility).

In addition, the systems and methods described herein are applicable to many types of merchandise items. Although described generally with respect to promotional items, it should be evident that they are not limited to promotional items and can be applied to other types of merchandise items. For example, the systems and methods would be suitable for any container likely to have a significant turnover of product type. Further, they would be suitable for any portable container likely to be moved to different locations within a shopping facility or even to different shopping facilities.

Referring again to FIG. 2, the ambient light sensor 302 is disposed within the container 304, preferably at or near the bottom or in a position where it will generally be concealed by merchandise items when the container holds a certain quantity of inventory. In this context, it is contemplated that ambient light sensor 302 can be disposed in generally any location, position, and orientation such that merchandise items in the container will block much of the ambient light until the container is in a low inventory condition. So, the ambient light sensor 302 may generally be disposed beneath or behind a sufficient number of merchandise items that block the sensor 302 from detecting light at a level that exceeds a certain threshold.

The ambient light sensor 302 may also be fastened, installed, and/or mounted within the container 304 in any of various ways to limit its movement. For example, it may be fastened in a temporary manner, such as by adhesive, screws, or other similar fasteners, so as to be readily removable from the container 304. Alternatively, it may be installed and/or mounted in a more permanent manner so as to be more closely integrated into the actual physical structure of the container 304.

The ambient light sensor 302 is preferably calibrated to a predetermined threshold prior to use. This calibration may be performed automatically by the light sensor 302 after taking into account the environmental lighting conditions in the specific area of the shopping facility where the container 304 is to be located. Alternatively, an individual may set the calibration manually. For example, an individual may measure the actual ambient light level at the specific area of the shopping facility and may then set the threshold a certain desired amount from the detected level. The light sensor 302 may be configured so as to have various predetermined discrete calibration settings, or it may be configured so that the calibration may be adjusted along a continuum of light level settings. Further, if the ambient light sensor 302 was previously calibrated in one area of the shopping facility, it may be recalibrated to a different setting if it is moved to a different area with different lighting conditions.

The light sensor 302 is operatively coupled to a control circuit 314. As described herein, the control circuit 314 may be integrated with the light sensor 302 or it may be part of a discrete, separate structure. The control circuit may be in wired or wireless communication with the light sensor 302. Further, the control circuit 314 can comprise a fixed-purpose hard-wired platform or can comprise a partially or wholly programmable platform, such as a microcontroller or any processor-based device, an application specific integrated circuit, a field programmable gate array, and so on. These architectural options are well known and understood in the art and require no further description here. The control circuit 314 may be configured (for example, by using corresponding programming stored in a memory as will be well understood by those skilled in the art) to carry out one or more of the steps, actions, and/or functions described herein.

The ambient light sensor compares the detected ambient light level with the threshold level. When there is a sufficient number of merchandise items generally blocking the ambient light from the light sensor 302, the detected light level is below the threshold level. The control circuit is not triggered. However, when a sufficient number of merchandise items have been removed from the container (such as by customers interested in purchasing the items), the detected light level is above the threshold level, and the control circuit is triggered. In one form, when triggered, the control circuit 314 transmits a signal 318 that serves as an alert regarding the low inventory. The signal 318 may be any of various types that can serve to communicate to any form of receiver(s) or sensor(s) 320 the low inventory condition of the container 304. As described below, the signal 318 may be communicated to an array of sensors 320 that may include just a single sensor or that may include multiple sensors arranged in a predetermined pattern in a predetermined area of the shopping facility. In one form, another step of the method may include the arranging of a predetermined array of sensors about a predetermined area of the shopping facility, the array of sensors arranged to receive the signal and identify the location of the container with a low inventory condition within the shopping facility.

Also, as described above, in an alternative form, the ambient light sensor 302 may be calibrated to have two or more different thresholds. For example, one threshold could correspond to a low inventory condition, while a second, higher threshold could correspond to a no inventory condition. In this example, the ambient light sensor 302 compares the detected ambient light level with the different threshold levels. When a sufficient number of merchandise items have been removed or when merchandise items are arranged in the container 304 in a certain way, and the detected light level is above any of the various threshold levels, the control circuit 314 is triggered. When triggered, the control circuit 314 transmits a signal 318 indicating a low inventory or indicating no inventory, depending on the threshold level that was exceeded. The signals are preferably different from one another in some way to distinguish the different inventory conditions. Further, as should be evident, the ambient light sensor 302 and control circuit 314 may be configured with multiple thresholds for the transmission of signals 318 indicating ever-decreasing low levels of inventory in the container 304.

In one form, the control circuit 314 is operatively coupled to a speaker 322 that emits an audio signal 324. The control circuit 314 may be integrated with the speaker 322 or it may be separate from it. The control circuit 314 may be in wired or wireless communication with the speaker 322. In one form, the light sensor 302, control circuit 314, and speaker 322 may all be integrated into one unitary structure, i.e., a combined light/sound device.

In this form, the control circuit 314 may be configured to generate an audio signal 324 within a desired frequency range. It may be desirable to select this frequency range so that the audio signal 324 is generally inaudible to human hearing so as not to disturb customers at the shopping facility. The speaker 322 may be selected and configured to generate an audio signal 324 having any desired acoustic characteristics, such as frequency, volume, and the like.

In this form, the array of sensors 320 may be an array of microphones 326. The microphones 326 are arranged in a desired pattern within a predetermined area of the shopping facility. For example, the microphones 326 may be arranged in a grid-like pattern with each microphone 326 spaced a certain distance from other microphones 326. With this arrangement, it is possible to triangulate the location of the speaker 322 (and container 304) by determining which specific individual microphones 326 detect the audio signal 324 and the signal strength at these microphones 326. Generally, the accuracy of triangulation will depend on the number and arrangement of the microphones 326. Although this description has involved audio signals and microphones, it should be evident that other types of signals and sensors may be used, such as antennas for receiving RF signals. Further, although one general triangulation approach has been described, any of various existing indoor localization techniques and algorithms may be used and appropriate in certain circumstances (including techniques based on angle of arrival and time of flight). Localization may be accomplished by wired or wireless communication.

In another form, the control circuit 314 is not operatively coupled to a speaker 322 but is instead configured to emit an identification code 328. In this form, each container 304 may be associated with a unique identification code 328 that provides specific information regarding the location of the container 304 within the shopping facility, the product type in the container 304, and/or other data. For example, the identification code 328 may contain specific information regarding the location of the container 304 only, and the product type will still have to be ascertained in some manner. As a second example, the identification code 328 may include both the container location information and product type information. As explained further below, the additional information in this second example allows the generation of other specific decisions and outcomes. This identification code 328 may then be received by any appropriately configured sensor 320.

In an alternative form, the speaker 322 may be used to transmit an identification code. More specifically, the control circuit 314 may be configured to cause the speaker 322 to emit different tones or a different sequence of tones with each unique tone or sequence of tones signifying a different identification code. The acoustic characteristics, such as frequency, volume, and the like, may be varied to signify different identification codes 328. Each different identification code may thereby communicate specific information regarding the location of the container 304 within the shopping facility, the product type in the container 304, and/or other desired data.

The sensor(s) 320 may be in communication with a server 330 at the shopping facility (or remote from the shopping facility). The server 330 uses the communicated information to generate a task 332. For instance, if an array of microphones 326 detects an audio signal 324, the server 330 and microphones 326 may communicate to triangulate the location of the container 304. The server may then create a task for an employee to check and service the location. Similarly, if an identification code 328 is detected and location information is communicated, the server 330 may create a task for an employee to check and service the location. Alternatively, if an identification code 328 is detected and both location and product information are communicated, the server 330 may be able to access data regarding current inventory to generate a different task. If inventory data indicates that the back room inventory quantity is greater than zero, it may create a task for an employee to restock the container. On the other hand, if on hand inventory data is below a certain threshold, the server 330 may create a task that the merchandise item be removed.

In another form, the sensor(s) 320 may be configured to communicate with a mobile device 334. For example, the communication may simply be in the form of an alert of a low inventory condition and the location of the container 304. This alert may result in the creation of a simple task 332 for an employee to check and service the location.

In one form, the control circuit 314 may be operatively coupled to a visual indicator 316, such as a flashing light. The control circuit 314 may be operatively coupled to the visual indicator 316 indicating the location of the container 304 and may be configured to activate the visual indicator 316 when the detected ambient light level exceeds the predetermined ambient light threshold. The visual indicator 316 may be disposed at or near the container 304 to indicate its location.

Figure 3:
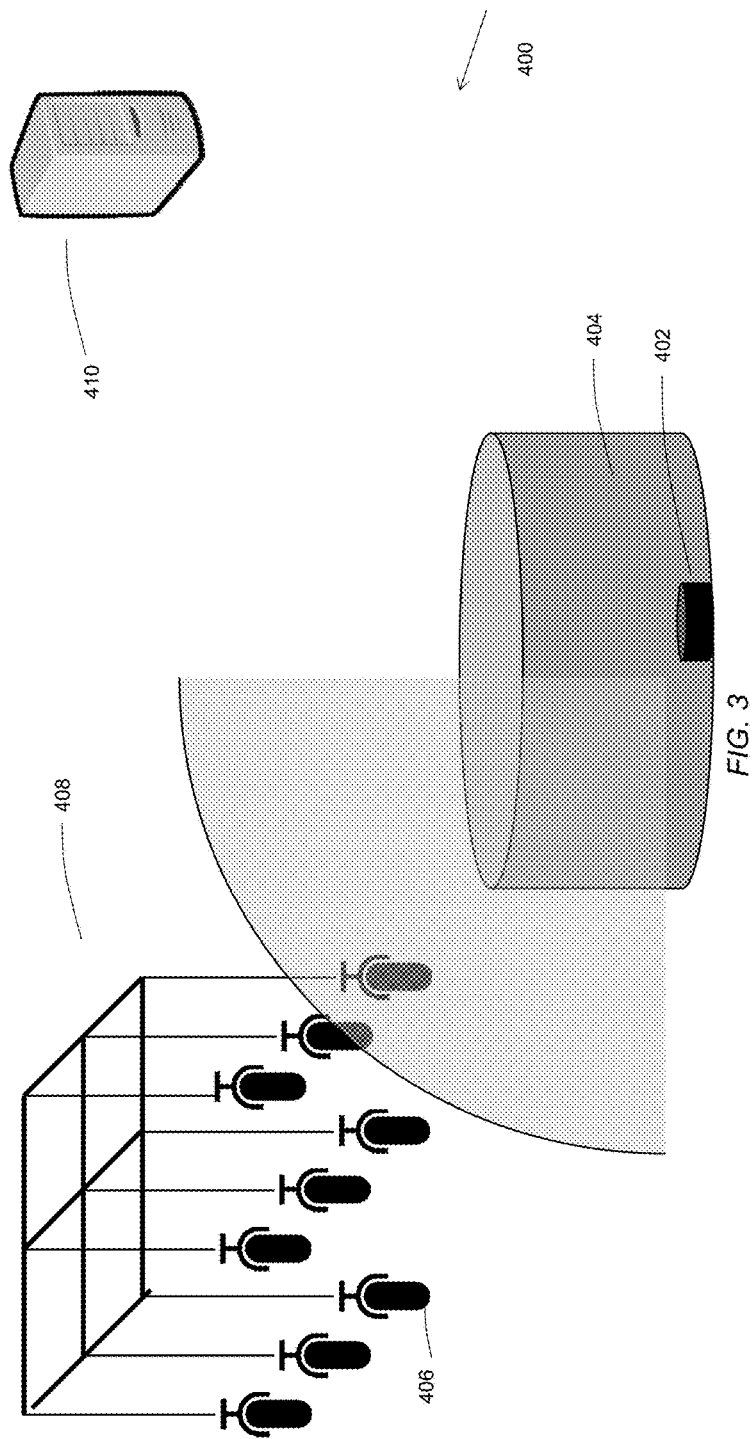
FIG. 3 is a schematic diagram in accordance with several embodiments.

Referring to FIG. 3, there is a shown a schematic diagram of a specific application of the systems and methods described herein. In this particular system 400, an ambient light sensor assembly 402 is disposed at the bottom of a dump bin 404 in a shopping facility. The exact location of the dump bin 404 in the shopping facility at any particular time may be uncertain because it may be frequently moved to different locations. In this form, the ambient light sensor assembly 402 is an integrated structure that preferably includes a light sensor, control circuit, and speaker, as described above. The assembly 402 is preferably calibrated to a desired ambient light threshold level that takes into account the environmental lighting conditions in that particular area of the shopping facility. After the assembly 402 is calibrated, the dump bin 404 is filled with a sufficient number and type of merchandise items so as to generally cover the assembly 402 and initially block much of the ambient light from the assembly 402. As described above, it should be evident that other different types of ambient light sensor assemblies (integrated or not integrated), calibration techniques, and types of containers and merchandise items are possible.

At some point, when a sufficient number of merchandise items have been sold (or otherwise removed from the dump bin 404), the light sensor assembly 402 will be sufficiently exposed to the ambient light so that the detected ambient light will meet and/or exceed the calibrated threshold level. When this threshold level is met and/or exceeded, the assembly will transmit an audio signal 404 indicating a low inventory condition. This audio signal 404 is picked up by one or more microphones 406 in a sensor array 408 located near the dump bin 404. Based on the specific individual microphones 406 that detect the audio signal 404 (and the intensity or other audio characteristics of the signal at these microphones), the general location of the dump bin 404 can be determined. Although a grid-like arrangement is shown for the sensor array 408, it should be evident that many other arrangements may be used. Further, as described above, other various types of sensors and signals (other than microphones and audio signals) and other types of indoor localization techniques and algorithms may be used.

In this form, the sensor array 408 is in wireless communication with a server 410 at the shopping facility. The sensor array 408 and server 410 may communicate with one another in order to calculate the general location the dump bin 404. The server 410 may then create a task for an employee, such as checking and servicing the low inventory of the dump bin 404. As should be evident, in other forms, the sensor array and server may be in wired communication and the server need not be at the shopping facility. Further, the sensor array may be configured to communicate with a device other than a server, such as a mobile device.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for identifying and determining the location of merchandise bins in a low inventory condition in shopping facilities, the system comprising:
    a bin configured to hold a plurality of merchandise items in a shopping facility;
    a light sensor disposed at the bottom of the bin;
    the light sensor configured to be covered by merchandise items in a normal inventory condition and to be partially or fully uncovered by merchandise items in a low inventory condition;
    the light sensor calibrated to detect an ambient light level and to respond when the detected ambient light level exceeds a predetermined ambient light threshold;
    a speaker configured to emit a predetermined audio signal indicating a low inventory condition;
    a control circuit operatively coupled to the light sensor and to the speaker, the control circuit configured to activate the speaker to transmit the predetermined audio signal indicating a low inventory condition when the light sensor determines the detected ambient light level exceeds the predetermined ambient light threshold; and
    a predetermined array of microphones arranged about a predetermined area of the shopping facility, the array of microphones arranged to receive the audio signal and to triangulate the location of the bin with the low inventory condition within the shopping facility based on signal strength of the audio signal received at different microphones in the predetermined array;
    wherein the light sensor, when it detects ambient light above the threshold, triggers the control circuit to activate the speaker; and
    wherein the audio signal is detected and triangulated by the predetermined array of microphones to determine the location of the bin in the shopping facility.

2. The system of claim 1, further comprising a server in communication with the array of microphones, the server configured to receive information regarding the location of the merchandise bin and to create a task to address the low inventory condition.

3. The system of claim 1, wherein the audio signal includes an identification code corresponding to the location of the merchandise bin with the low inventory condition.

4. The system of claim 1, wherein the light sensor is recalibrated to respond to a different predetermined ambient light threshold when the merchandise bin is moved to a different shopping facility location, the different predetermined ambient light threshold corresponding to the ambient light conditions at the different shopping facility location.

5. The system of claim 1, wherein the light sensor is mounted and fastened to the merchandise bin to limit movement of the light sensor.

6. The system of claim 1, wherein the light sensor includes one or more of a phototransistor, a photodiode, and a photoresistor.

7. A method of identifying and locating merchandise bins holding merchandise items in a low inventory condition within shopping facilities, the method comprising:
    providing a light sensor that detects ambient light;
    positioning the light sensor in a bottom of a merchandise bin in a shopping facility;
    providing a speaker configured to emit a predetermined audio signal indicating a low inventory condition;
    operatively coupling a control circuit to the light sensor and to the speaker;
    depositing a sufficient number of merchandise items in the merchandise bin to block the light sensor from ambient light in excess of a predetermined ambient light threshold;
    by the control circuit, activating the speaker to transmit the predetermined audio signal indicating a low inventory condition when the detected ambient light level exceeds the predetermined ambient light threshold to transmit an audio signal; and
    arranging a predetermined array of microphones about a predetermined area of the shopping facility, the array of microphones arranged to receive the signal and identify triangulate based on signal strength the location of the merchandise bin with a low inventory condition within the shopping facility.

8. The method of claim 7, further comprising calibrating the light sensor to respond to ambient light when the detected ambient light level exceeds the predetermined ambient light threshold.

9. The method of claim 8, wherein the calibration is manually initiated or performed automatically.

10. The method of claim 7, further comprising communicating the location to a server and creating a task to address the low inventory condition.

11. The method of claim 7, wherein the control circuit is configured to transmit the audio signal with an identification code corresponding to the location of the merchandise bin with the low inventory condition.

12. The method of claim 7, further comprising moving the merchandise bin to a different shopping facility location and recalibrating the light sensor to respond to a different predetermined ambient light threshold corresponding to ambient light conditions at the different shopping facility location.

13. The method of claim 7, wherein the positioning the light sensor in the merchandise bin further comprises mounting and fastening the light sensor to the merchandise bin to limit movement of the light sensor.

14. The method of claim 7, wherein the control circuit is operatively coupled to a visual indicator indicating the location of the merchandise bin and is configured to activate the visual indicator when the detected ambient light level exceeds the predetermined ambient light threshold.

\* \* \* \* \*